United States Patent
Johnson et al.

(10) Patent No.: US 10,270,857 B2
(45) Date of Patent: Apr. 23, 2019

(54) ASYNCHRONOUS DUPLEXING

(71) Applicant: INTERNATIONAL BUSINESS MACHINES CORPORATION, Armonk, NY (US)

(72) Inventors: Neil A. Johnson, Cornwall, NY (US); Georgette Kurdt, Wappingers Falls, NY (US); William C. Neiman, Poughkeepsie, NY (US); Kenneth G. Rothwell, Red Hook, NY (US); David H. Surman, Hyde Park, NY (US); Jessie Yu, Wappingers Falls, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 190 days.

(21) Appl. No.: 15/282,164

(22) Filed: Sep. 30, 2016

(65) Prior Publication Data
US 2018/0097879 A1    Apr. 5, 2018

(51) Int. Cl.
*H04L 29/08* (2006.01)
*G06F 15/167* (2006.01)

(52) U.S. Cl.
CPC ........ *H04L 67/1097* (2013.01); *G06F 15/167* (2013.01); *H04L 67/1095* (2013.01)

(58) Field of Classification Search
CPC ................................................. H04L 67/1097
See application file for complete search history.

(56) References Cited

U.S. PATENT DOCUMENTS

| | | | |
|---|---|---|---|
| 4,507,751 A | 3/1985 | Gawlick et al. | |
| 5,440,727 A | 8/1995 | Bhide et al. | |
| 6,493,727 B1* | 12/2002 | Huang | G06F 17/30575 707/610 |
| 6,604,205 B1* | 8/2003 | Huang | G06F 11/1443 707/999.201 |
| 6,751,750 B1 | 6/2004 | Humlicek | |
| 7,457,830 B1* | 11/2008 | Coulter | G06F 11/1471 |

(Continued)

OTHER PUBLICATIONS

Bernstein et al., "Implementing recoverable requests using queues.", ACM SIGMOD Record 19.2 (1990), pp. 112-122.
(Continued)

*Primary Examiner* — Andrew C Georgandellis
(74) *Attorney, Agent, or Firm* — Cantor Colburn LLP; William Kinnaman

(57) ABSTRACT

A computer-implemented method for asynchronous duplexing between two computing devices includes obtaining a task for execution by a first computing device and executing the task. A first computing task completion identifier is assigned upon execution of the task. The task with the assigned first computing task completion identifier is transferred to a second computing device and executed. A second computing task completion identifier is assigned upon execution of the task. The first computing task completion identifier and the second computing task identifier are logged into a task management log for facilitating the recovery of the first computing device by comparing the first computing task completion identifier and the second computing task identifier for identifying tasks executed by the first computing device and requiring execution by the second computing device.

10 Claims, 5 Drawing Sheets

(56) References Cited

U.S. PATENT DOCUMENTS

2006/0248126 A1* 11/2006 Melander ............ G06F 11/1471
2008/0028171 A1*  1/2008 Uratani ............... G06F 11/2071
                                                        711/162

OTHER PUBLICATIONS

Corbett et al., "Spanner: Google's globally distributed database.", ACM Transactions on Computer Systems (TOCS), 2013, pp. 251-264.
Mohan et al., "ARIES: a transaction recovery method supporting tine-granularity locking and partial rollbacks using write-ahead logging.", ACM Transactions on Database Systems (TODS) 17.1, 1992, pp. 94-162.
Pu et al.,"Replica Control in Distributed Systems: An Asynchronous Approach", vol. 20. No. 2. ACM, 1991, pp. 1-16.

* cited by examiner

ASYNCHRONOUS DUPLEXING

BACKGROUND

Computer systems utilize components such as databases and memory that are routinely being updated. In order to maintain the integrity of the computer system, redundant backup systems are maintained in the event the primary system suffers a failure. In such an event, the backup files are utilized to restore the operation of the primary system. However, most current backup systems employ synchronous updating of the primary system and backup systems which incur processing resources which delay the actual performance of the requested task by the primary system and consequently impedes the performance of the primary system. Accordingly, there is a need to provide a backup system which does not impede the performance of the primary system.

SUMMARY

In accordance with one or more embodiments, a computer-implemented method for asynchronous duplexing between two computing devices is provided. The method includes obtaining, using a processor system, a task for execution by a first computing device and executing the task by the first computing device. A first computing task completion identifier is assigned upon execution of the task by the first computing device. The task with the assigned first computing task completion identifier is transferred to a second computing device and executed. A second computing task completion identifier is assigned upon execution of the task by the second computing device. The first computing task completion identifier and the second computing device task identifier are logged into a task management log for facilitating the recovery of the first computing device by comparing the first computing task completion identifier and the second computing device task identifier for identifying tasks executing by the first computing device and requiring execution by the second computing device.

In one or more embodiments of the invention a system for asynchronously duplexing between two computer devices, the system includes a memory and a processor system communicatively coupled to the memory. The memory is configured to store a plurality of tasks identified as being executed by a first computing device and the processor is configured to receive an indication that a plurality of tasks executed by a first computing device have been executed by a second computing device. The processor is further configured to determine which tasks have been executed by the first computing device but remain unexecuted by the second computing device. The processor transmits the tasks which have been determined as being executed by the first computing device but unexecuted by the second computing device to the second computing device for execution; and wherein the second computing device may be assigned all tasks previously executed by a first computing device to provide a backup operational system in the event the first computing device becomes unavailable for processing tasks.

In accordance with one or more embodiments, a computer program product for asynchronous duplexing is provided wherein the computer program product includes a computer readable storage medium having program instructions embodied therewith, wherein the computer readable storage medium is not a transitory signal per se, the program instructions being readable by a processing circuit to cause the processing circuit to perform a method which includes obtaining, using a processor system, a task for execution by a first computing device, and executing, using a processor system, the task by the first computing device Upon execution of the task by the first computing device a first computing task completion identifier is assigned. The task with assigned first computing task completion identifier is transmitted to a second computing device. The task is executed by the second computing device and assigned a second computing task completion identifier. The first computing task completion identifier and the second computing device task identifier are logged using a processor system and wherein, a task management log is established for facilitating the recovery of the first computing device by comparing the first computing task completion identifier and the second computing device task identifier for identifying tasks executed by the first computing device and requiring execution by the second computing device.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments of the present disclosure include systems, computer program products, and method for asynchronous duplexing. Asynchronous duplexing is a method by which a primary resource and a secondary resource maintain a functional equivalence using a store and forward methodology which results in a delayed instance of functional equivalence at the secondary resource. Due to this delayed instance of functional equivalence, the secondary structure may be behind the primary and missing updates. In recovery situations, where the primary resource is lost, the secondary structure is not a viable structure for fail-over until any missing updates have been applied. The present invention creates a system which facilitates the establishment of a reliable secondary recovery system by tracking missing updates enabling the secondary resource to become a functional equivalent copy of the primary resource during failure situations where the primary resource has failed and is no longer available. A task management log is established which is maintained to track updates which have been executed or stored in the primary resource but which have not yet been executed or stored in the secondary resource. The task management log contains a rolling list of the updates that may be utilized to transmit to the secondary resource when the primary structure is not available.

Figure 1:
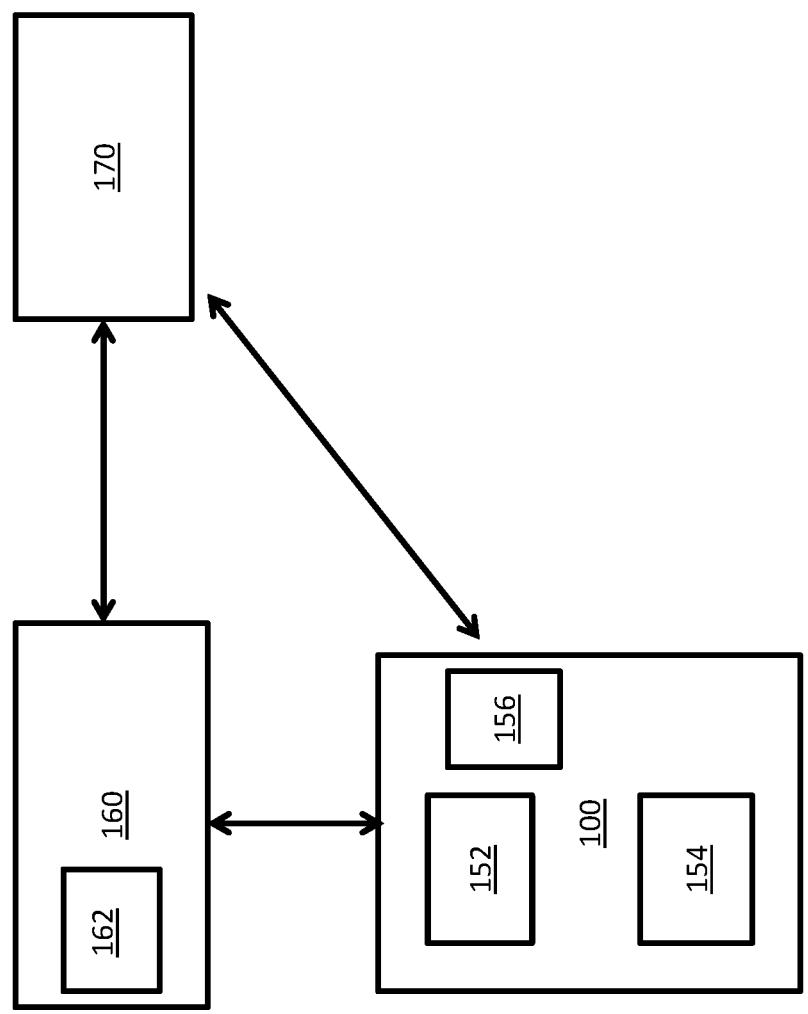
FIG. 1 illustrates a computer system according to one or more embodiments.

Turning now to a more detailed description of the present disclosure, there is shown in FIG. 1, a primary computer system 100 which interfaces with a first computing device. The first computing device may be any type of computing device capable of communicating with a second computing device 170 facilitating in the establishment of a backup recovery system. First computing device 160 may be a database or memory storing data records. To provide redundancy as a backup unit, second computing device 170 may also be a database or memory storing data records. Primary computer system 100 includes an operating system 154 which manages the operation of primary computer system 100 and interfaces with a first computing device 160 by designating tasks for processing by first computing device 160. Certain operational tasks might include processing a data update task or a data storage task. These operational tasks are undertaken by the first computing device at the direction of the operating system of primary computer system 100. As operational tasks are assigned by the operating system of the computer system, knowledge of the current state of operational tasks completed by the first computing device is unknown until acknowledgments of the performed tasks are obtained by the operating system and stored in task management log 152.

Task management log 152 includes a list of the assigned operational tasks for processing by the first computing device 160. This table is utilized by the system to track the status of the state of operation of the first computing device and is configured for recovery purposes. The table maintains a copy of operational tasks for subsequent utilization in rebuilding the system in case the first computing device 160 fails. Acknowledgments of the performance of the respective operational task are transmitted from the first computing device to the computer system to for reporting the state of the first computing device. These acknowledgments are also maintained in the task management log 152 but may be stored in another table which is accessible by the operating system.

As shown in FIG. 1, first computing device 160 communicates with primary computer system 100 for receiving operational tasks. The operational tasks are stored in first computing device task management log 162. The tasks are executed and in one embodiment assigned a first task completion identifier, such as a sequence number. The first task completion identifier will be transmitted to primary computer system 100 for identifying that the particular task has been performed by the first computing resource.

According to one embodiment, to provide for a functioning backup system, upon completion of the operational task by the first computing device and assignment of the respective first task completion identifier, the respective operational task and first task completion identifier are transmitted from the first computing device to the second computing device for performance by the second computing device. In this manner, the second computing device will provide a functional equivalent to the primary first computing device by executing the similar tasks as previously executed by the first computing device. With the completion of the operational task by the first computing device and subsequent transmission to the second computing device, the second computing resource is asynchronously duplexing the first computing resource.

Figure 2:
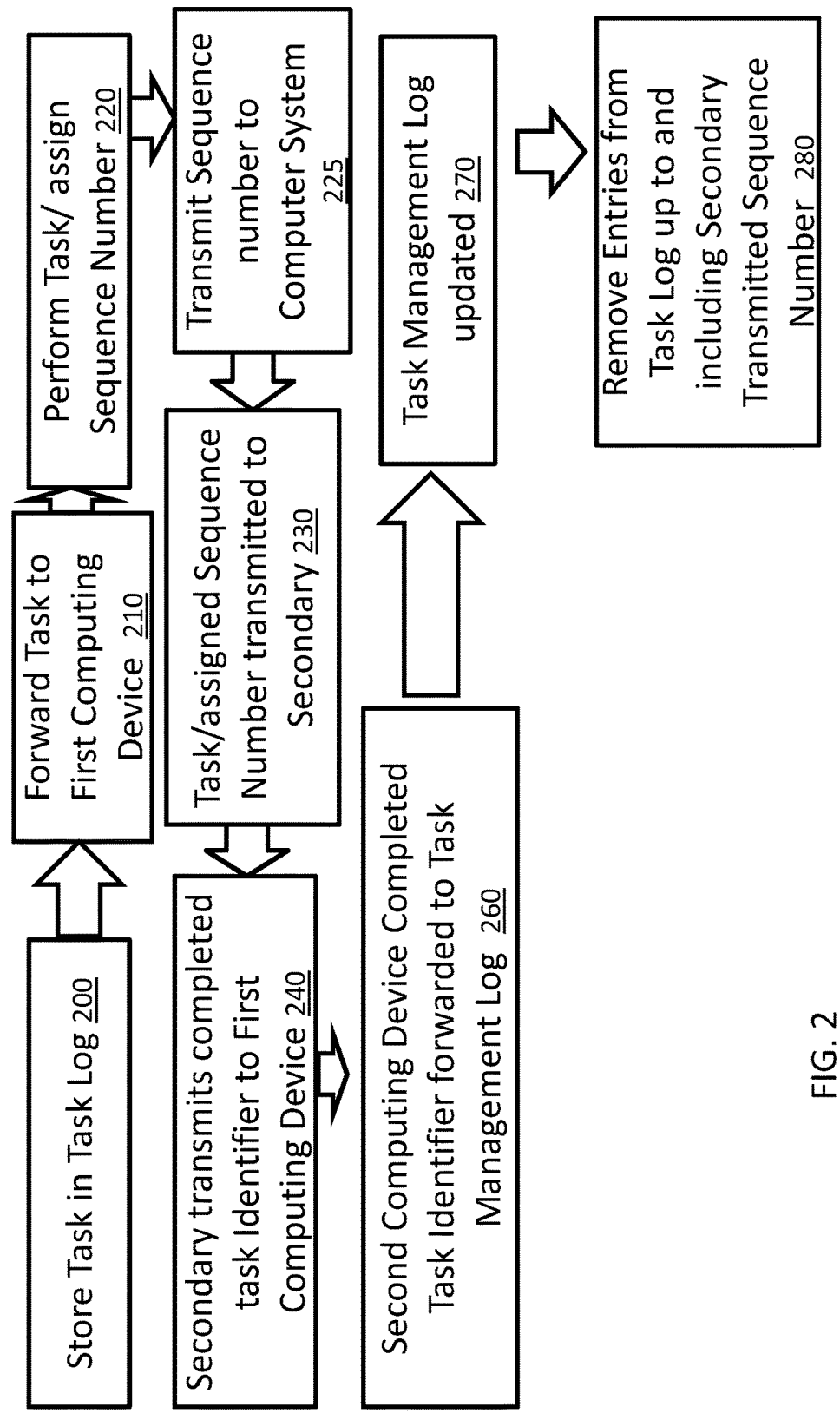
FIG. 2 illustrates a flow chart of an asynchronous duplexing process according to one or more embodiments.

FIG. 2 is a flow chart illustrating one method for the operational processing of the asynchronous duplexing system. Initially, an operational task requiring performance by the first computing device is identified by the operating system of primary computer system 100. The operational task is stored in task management log 152 of the computing system at block 200. The task is forwarded to the first computing device where the operational task is stored in a respective first computing device task management log 162 at block 210. The task is performed by the first computing device and upon completion is assigned a first task completion identifier such as a respective sequence number at block 220. The first computing device subsequently transmits the first task completion identifier to the computer system at block 225. This transaction acknowledges to the operating system that the task has been completed and also enables the operating system to know the current state of the first computing device. Preferably, simultaneously with the transmission of the first task completion identifier at block 225 the completed operational task and respective first task completion identifier are transmitted to the second computing device at block 230. The second computing device performs the operational task and assigns a second task completion identifier identifying that the operational task has been completed by the second computing device at step 240. This second task completion identifier may be the same identifier as assigned by the first computing device upon completion of the task by the first computing device. For instance, if the operational task was assigned a sequence number of "1057" upon completion by the first computing device, then the same identifier "1057" may be assigned by the second computing device upon completion.

Upon completion by the second computing device, at block 240, the second computing device transmits the second task completion identifier to the first computing device. This acknowledges to the first computing device that the second computing device is a functional copy of the first computing device up till the processing of this respective transaction. Once the first computing device acquires the operational task identifier submitted by the second computing device, the first computing device forwards the second task completion identifier to the primary computer system 100 at block 260. Once received by the primary computer system 100, the task management log is updated at block 270 to reflect the task which has been processed by the backup second computing device. This identifies the state of the backup if needed.

In one embodiment, when the first task completion identifier or sequence number is transmitted to the computer system at block 225, the task management log is updated with the performed task at block 280. When the performed task is also completed by the second computing device, then maintaining this information on which tasks have been completed in the log is no longer required. As shown in FIG. 2, when the task management log is updated with the task performed by the second computing device, this indicates that the second computing device is a functional equivalent of the first computing device up till the completion of that specific task. Accordingly, the respective task management log identifying the completed tasks can be updated at block 280 with the removal of all prior tasks executed by the first computing device as the information is no longer required.

Figure 3:
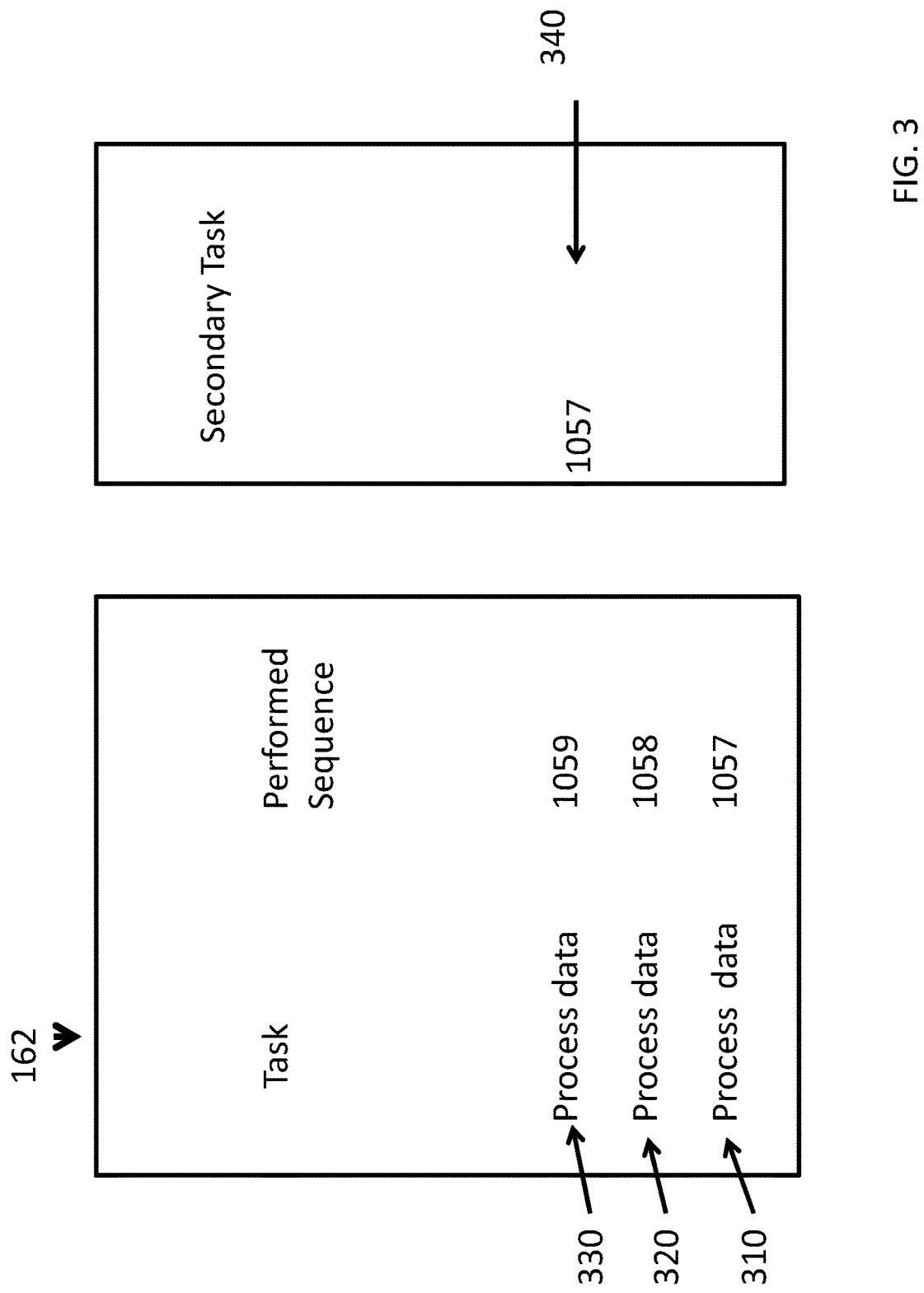
FIG. 3 illustrates a task completion table utilized in one or more embodiments.

FIG. 3 illustrates the use of a first computing device task management log associated with the first computing device to facilitate the asynchronous duplexing according to the invention. In operation, tasks are provided by the operating system of the primary computer system 100 to be performed by first computing device 160, once completed the task is provided a first resource completed task identifier. This first resource completed task identifier is utilized for transmission to the operating system to identify which particular task has been completed. This first resource completed task identifier is transmitted to the operating system immediately upon completion to provide a timely acknowledgment of the task's execution and status of the first computing resource. As shown in FIG. 3, a first task 310 identifies a task for processing data that was completed and assigned the first task completion identifier 1057 which is a sequence identifier. A second task 320 identifies a subsequent task for processing data that was completed and assigned the first task completion identifier 1058. A third task 330 identifies a subsequent task for processing data that was completed and assigned the first task completion identifier 1059.

As shown in FIG. 3, first computing device task management log 152 also may contain the second computing resource task completion identifier 340. The second computing resource task completion identifier 340 indicates that task 310 identified by first task completion identifier "1057" was recently executed and completed by the second computing device. This information will subsequently be transmitted by the first computing device to the computer system 100 upon the next status update request by the operating system.

In operation, communication between the operating system of computer system 100 and the first computing device 160 is continuous so each system is interconnected and the processing of transactions may be monitored and effectively controlled by the operating system of the computer system. It is customary to have continuous feedback between the systems. For instance, when task associated with processing data 310 in FIG. 3 is initially sent from the operating system 154 to the first computing device 160, first computing device 160 transmits an acknowledgment of the receipt of the task. Upon completion of task 310, the first computing device 160 transmits a completion indicator to the operating system. In one embodiment, when the first task completion identifier is transmitted to the operating system indicating that the task has been completed, the second computing resource task completion identifier 340 is also transmitted in the same communication. For example, as shown in FIG. 3, task 310 would return first task completion identifier 1057, as no secondary task identifier has been provided by the second computing device at this time, only the first task completion identifier would be provided to the operating system. This procedure would also be conducted with respect to task 310. When task 330 had been performed by the first computing device and the second task completion identifier "1057" identifying that task 310 had been performed by the second computing resource is provided to the first computing device, both the first task completion identifier "1059" and the second task completion identifier "1057" would be provided to the operating system 154 for placement within task management log 152.

The completion of task 310 by the second computing device at the time that the first computing device had completed task 330 illustrates the asynchronous duplexing of the first computing device with the second computing device. This occurs due to the delay in transmitting the task to the second computing device and the execution of the task by the second computing device. As shown in FIG. 3, upon completion of task 330, first task completion identifier "1059" will be transmitted to the operating system with the second computing task identifier "1057" identifying the status of both the first computing device and second computing device. The system will continue in this manner transmitting the first task completion identifier reflecting the state of the first computing device with the second computing task identifier reflecting the state of the second computing device to the operating system.

Figure 4:
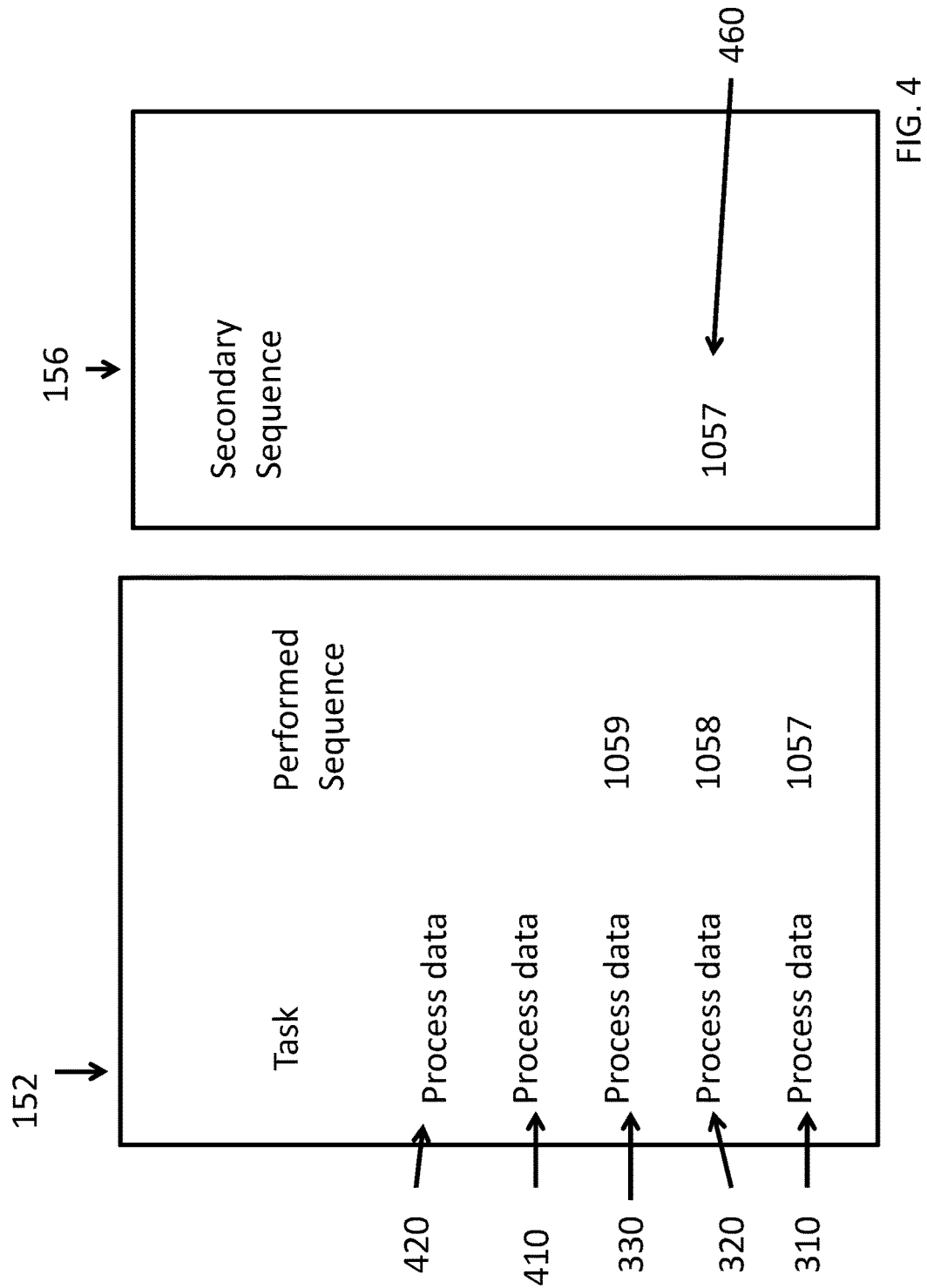
FIG. 4 illustrates a task management log utilized in one or more embodiments.

FIG. 4 illustrates task management log 152 associated with the computer system 100. Task management log 152 includes the tasks assigned to the first computing device. As shown in task management log 152, tasks 310, 320 and 330 have each been processed by the first computing device and returned first computing task identifier "1057", "1058", and "1059" respectively. This indicates that the state of the first computing device at this time is up to date as of task 330. Tasks 410 and 420 have been assigned to the first computing device but have not received an acknowledgment that the tasks have been completed. Task management log 152 may be associated with a secondary update table 156 which identifies the most recent task executed by the second computing device. As shown in secondary update table 156, the second computing task completion identifier is "1057" which corresponds to task 310 with the identifying sequence identifier "1057" as assigned by the first computing device upon execution. Upon receipt of the second computing task completion identifier 460 identifying task "1057" as being the current state of the second computing resource, then task 310 may be removed from the task management log. In an embodiment, secondary update table 156 may be an integrated part of task management log 152 as the division of the tables into separate or integrated entities may be done in any fashion by a system designer.

In operation, the asynchronous duplexing method of the invention utilizes the task management log 152 which includes secondary replay table 156 for rebuilding the system utilizing the second computing device in the event that the first computing device fails. During the processing of the respective tasks by the first computing device, upon completion of a respective task, the task is subsequently transmitted to the second computing device for execution enabling the second computing device to become a duplicate of the first computing device. Due to the delay in the processing of the respective tasks between the execution by the first computing device and the second computing device, the second computing device is not an accurate duplicate of the first computing device as shown by task management log 152 identifying that task 330 is the most recently executed task by the first computing device while task 310 is the most recently executed task by the second computing device. In the event that the first computing device fails, the operating system via task management log 152 can reconstruct the first computing device via the secondary computing device by utilizing the task management log to identify that the current state of the second computing device is that of the completion of task 310 requiring the subsequent transmission of tasks 320 and 330, which previously had been performed by the first computing resource and returned with a first task completion identifier of "1058" and "1059" respectively but yet performed by the second computing resource as indicated by the omission of the completion identifiers "1058" and "1059" from the secondary table. The submission of tasks 320 and 330 to the second computing device brings the system up to date.

Figure 5:
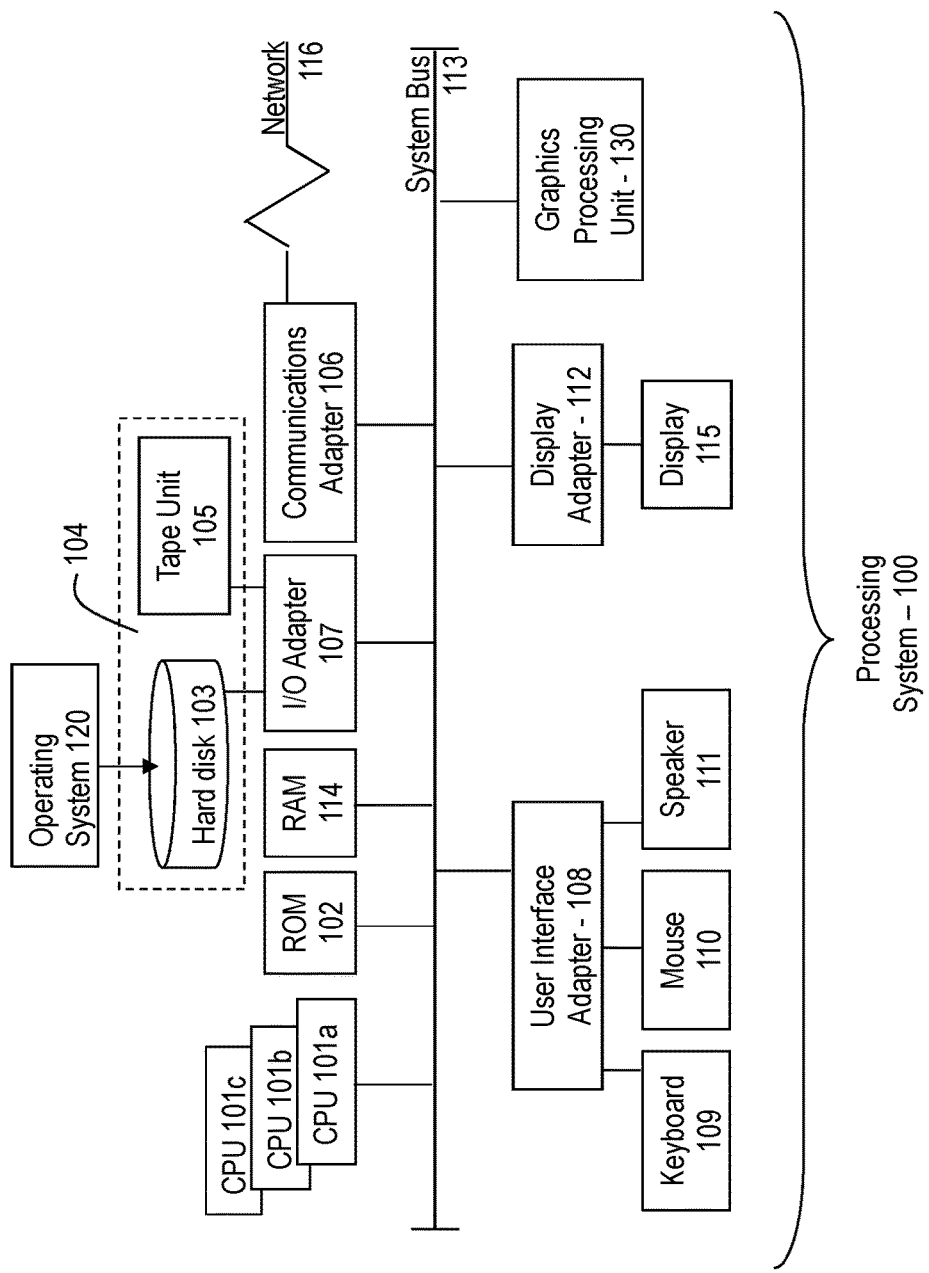
FIG. 5 shows a computer system according to an embodiment.

In one embodiment, as shown in FIG. 5, task management log 152 may contain unexecuted tasks 410 and 420, as evidenced by not yet receiving an associated first task completion identifier. Tasks 410 and 420 may be transmitted to the second computing device for bringing the second computing device up to date per the tasks assigned by the operating system to the first computing device including all executed and non-executed tasks.

Referring to FIG. 5, there is shown primary computer system 100 according to one or more embodiments. First computing device 160 and second computing device may have the same configuration as primary computer system 100. The primary computer system 100 has one or more central processing units (processors) 101*a*, 101*b*, 101*c*, etc. (collectively or generically referred to as processor(s) 101).

In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 5 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling log management system 100 to communicate with other such systems. A screen (e.g., a display monitor) 115 is connected to system bus 113 by display adaptor 112, which may include a graphics adapter to improve the performance of graphics intensive applications and a video controller. In one or more embodiments, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 5, the processing system 100 includes processing capability in the form of processors 101, storage capability including the system memory 114 and mass storage 104, input means such as keyboard 109 and mouse 110, and output capability including speaker 111 and display 115. In one or more embodiments, a portion of system memory 114 and mass storage 104 collectively store an operating system to coordinate the functions of the various components shown in FIG. 4.

In this illustrative example, the advantage of the embodiment as shown enables a recovery system to be established utilizing asynchronous duplexing. Most standard backup systems utilize synchronous updating or duplexing which slows down the processing time of the systems as an initial task is required to be transmitted to separate distinct systems, the primary and backup system, simultaneously in order to create a mirror recovery system exactly matching the primary. Consequently, both systems are required to execute the same tasks before an additional task is transmitted. This requires both systems to operate synchronously at the same speed, or the system performs at the speed of the slower device, and also requires checking and validation systems in place and other overhead processing tasks to be utilized to ensure that the systems are operating in sync.

The advantage of the embodiments utilizing asynchronous duplexing enables the primary unit to obtain faster processing speeds because the checking and validation systems are not required as the recovery backup unit is not required to be in sync with the primary system The utilization of tables and logs ensures that while the second recovery system is not an exact replica of the primary system, the second recovery system may be built utilizing the tasks in the task management log to replicate the primary system. Additionally, the present embodiments utilize standard communication networks between the respective components for transmitting the completed task information of the first and second computing devices with the primary operating system. No additional overhead is required. The first task completion identifier is transmitted from the first resource to the operating system utilizing the standard acknowledgment communication exchange utilized for acknowledging the completion of a task. In the embodiment of the asynchronous duplexing, this standard acknowledgment communication exchange also includes the task completion identifier of the second resource. Additionally, the task identifier of the second computing device is transmitted to the first computing device utilizing the exchange which would be utilized for the second computing device acknowledging receipt of the task information exchanged by the first computing device. Additionally, in the event that the first system fails, the operating system is able to directly communicate with the second computing device for rebuilding the system from the logged information. Prior to the rebuilt, the operating system is not required to be in communication with second computing device which further reduces the overhead required on the operating system as compared to a complete mirrored recovery system and improves the performance time of the tasks associated with the operating system as it is not required to interact with two systems simultaneously, but only the primary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically identified device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, micro-identifier, firmware instructions, state-setting data, or either source identifier or object identifier written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for asynchronous duplexing between two computing devices, the method comprising:
    obtaining, by an operating system of a primary computing system, a task for execution by a first computing device;
    storing the task in a task management log of the primary computing system;
    executing the task by the first computing device;
    assigning a first computing task completion identifier upon execution of the task by the first computing device;
    transmitting, by the first computing device, the task together with the first computing task completion identifier to a second computing device;
    executing the task by the second computing device;
    assigning a second computing task completion identifier upon execution of the task by the second computing device;
    transmitting, by the second computing device, the second computing task completion identifier to the first computing device;
    transmitting, by the first computing device, the second computing task completion identifier together with the first computing task completion identifier to the primary computing system;
    updating the task in the management log to include the first computing task completion identifier and the second computing task completion identifier;
    comparing, by the operating system, first computing task completion identifiers with second computing task completion identifiers to identify which tasks are executed by the first computing device and unexecuted by the second computing device; and
    transferring, by the operating system, the tasks unexecuted by the second computing device to the second computing device for execution.

2. The computer-implemented method of claim 1, wherein the task management log includes a plurality of first computing task completion identifiers relating to tasks executed by the first computing device and a plurality of second computing task completion identifiers relating to tasks executed by the second computing device.

3. The computer-implemented method of claim 1, wherein the transferring of the tasks unexecuted by the second computing device to the second computing device is undertaken by the operating system when the first computing device requires restoring.

4. The computer-implemented method of claim 1, wherein the task management log includes a plurality of tasks unexecuted by the first computing device, the operating system transferring the tasks unexecuted by the first computing device to the second computing device when the first computing device requires restoring.

5. The computer-implemented method of claim 1, wherein the first computing device includes a first computing device task log for maintaining tasks assigned to the first computing device for execution.

6. The computer-implemented method of claim 1, wherein the first computing device, using a processor system, transfers an executed task to the second computing device for execution after the first computing task completion identifier has been assigned to the task upon execution.

7. The computer-implemented method of claim 1, wherein the second computing task completion identifier is the same as the first computing task completion identifier.

8. The computer-implemented method of claim 1, wherein tasks identified as being executed by both the first and second computing devices are removed from the task management log.

9. A computer program product for asynchronous duplexing, the computer program product comprising a non-transitory computer readable storage medium having program instructions embodied therewith, the program instructions readable by a processing circuit to cause the processing circuit to perform a method comprising:

obtaining, by an operating system of a primary computing system, a task for execution by a first computing device;

storing the task in a task management log of the primary computing system;

executing the task by the first computing device;

assigning a first computing task completion identifier upon execution of the task by the first computing device;

transmitting, by the first computing system, the task together with the first computing task completion identifier to a second computing device;

executing the task by the second computing device;

assigning a second computing task completion identifier upon execution of the task by the second computing device;

transmitting, by the second computing device, the second computing task completion identifier to the first computing device;

transmitting, by the first computing device, the second computing task completion identifier together with the first computing task completion identifier to the primary computing system;

updating the task in the management log to include the first computing task completion identifier and the second computing task completion identifier;

comparing, by the operating system, first computing task completion identifiers with second computing task completion identifiers to identify which tasks are executed by the first computing device and unexecuted by the second computing device; and transferring, by the operating system, the tasks unexecuted by the second computing device to the second computing device for execution.

10. The computer program product of claim 9, wherein the method further comprises determining the transferring of the tasks unexecuted by the second computing device to the second computing device to occur when the first computing device requires restoring.

* * * * *